(12) United States Patent
Chong et al.

(10) Patent No.: US 7,724,758 B2
(45) Date of Patent: May 25, 2010

(54) DATA FORWARDING

(75) Inventors: Huai-Ter Victor Chong, Dallas, TX (US); Craig W. Warner, Addison, TX (US); Richard W. Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1467 days.

(21) Appl. No.: 10/756,438

(22) Filed: Jan. 12, 2004

(65) Prior Publication Data

US 2005/0152384 A1    Jul. 14, 2005

(51) Int. Cl.
*H04L 12/28* (2006.01)
(52) U.S. Cl. ........................... 370/413; 370/392
(58) Field of Classification Search .................. 370/419, 370/413, 392, 412
See application file for complete search history.

(56) References Cited

U.S. PATENT DOCUMENTS

| | | | | |
|---|---|---|---|---|
| 4,885,739 A | * | 12/1989 | Read et al. | 370/384 |
| 5,438,567 A | * | 8/1995 | Ikeda | 370/417 |
| 5,642,347 A | * | 6/1997 | Buckland | 370/242 |
| 5,841,769 A | * | 11/1998 | Okanoue et al. | 370/338 |
| 5,881,303 A | * | 3/1999 | Hagersten et al. | 712/30 |
| 5,933,429 A | * | 8/1999 | Bubenik et al. | 370/392 |
| 6,483,841 B1 | * | 11/2002 | Chang et al. | 370/412 |
| 6,650,651 B1 | * | 11/2003 | Meredith et al. | 370/412 |
| 6,791,947 B2 | * | 9/2004 | Oskouy et al. | 370/238 |
| 7,154,885 B2 | * | 12/2006 | Nong | 370/380 |
| 2002/0126673 A1 | * | 9/2002 | Dagli et al. | 370/392 |
| 2003/0233328 A1 | * | 12/2003 | Scott et al. | 705/50 |

* cited by examiner

*Primary Examiner*—Ayaz R Sheikh
*Assistant Examiner*—Blanche Wong

(57) ABSTRACT

Transactions are received through at least two input channels, each transaction comprising one or more data packets. The data packets are placed in a single data queue. When a first transaction received through one input channel comprises more than one data packet, a data packet of a second transaction received through another input channel is permitted to be placed in the single data queue between data packets of the first transaction. A block of space in a data output queue is assigned to each transaction. Each data packet is placed in the block assigned to its transaction.

24 Claims, 2 Drawing Sheets

| Channel 12A | H0 | A0 | B0 | C0 | D0 |   |   |   |
|---|---|---|---|---|---|---|---|---|
| Channel 12B | H1 | A1 | B1 | C1 | D1 |   |   |   |
| Data Processor | A0 | A1 | B0 | B1 | C0 | C1 | D0 | D1 |
| Write Pointer | 0 | 4 | 1 | 5 | 2 | 6 | 3 | 7 |
| Output start signal | 1 | 1 | 0 | 0 | 0 | 0 | 0 | 0 |

Fig. 2

DATA FORWARDING

FIELD OF THE INVENTION

The invention relates to data forwarding.

BACKGROUND OF THE INVENTION

Computer systems, and other data-handling systems, need to transfer data from one part of a system to another. This sometimes involves transferring data from two or more input channels to a common output channel. When the incoming data is in the form of transactions, and a transaction may be transmitted in the form of two or more packets, it is usually desirable to ensure that packets from different transactions do not become confused.

SUMMARY

According to one embodiment of the invention, there is provided a method of forwarding data, comprising receiving transactions through input channels, each transaction comprising one or more data packets, placing the data packets in a single data queue, when a first transaction received through one input channel comprises more than one data packet, permitting a data packet of a second transaction received through a second input channel to be interleaved between data packets of the first transaction in the single data queue, assigning a block of space in a data output queue to each transaction, and placing each data packet in the block assigned to its transaction.

According to another embodiment of the invention, there is provided a device for forwarding data, comprising a data processor arranged to receive transactions comprising data packets through input channels and to place the data packets in a single data queue, the data processor permitting a data packet received through one input channel to be interleaved between two data packets belonging to a single transaction received through a second input channel, and a data output queue arranged to receive the data packets from the single data queue and to store the data packets at addresses specified by the data processor, wherein the data processor is arranged to transmit the data packets to the data output queue in the order in which the packets are placed in the single data queue, and to specify, for the data packets of each transaction, addresses in a block of contiguous addresses assigned to the transaction.

According to a further embodiment of the invention, there is provided a data forwarder comprising first means for receiving transactions through input channels, each transaction comprising one or more packets, second means for placing data packets from the input channels in a single data queue, the second means permitting a data packet from one of the input channels to be interleaved between two data packets from a single transaction received through a different one of the input channels, third means for assigning to each transaction a block of addresses, fourth means for assigning to each data packet an address within the block of addresses assigned to the data packet's transaction, and fifth means for queuing the data packets in accordance with the assigned addresses.

BRIEF DESCRIPTION OF THE DRAWINGS

For purposes of illustrating the invention, the drawings show one or more forms in which the invention can be embodied. The invention is not, however, limited to the precise forms shown. In the drawings:

FIG. 2 is a chart.

DETAILED DESCRIPTION

Figure 1:
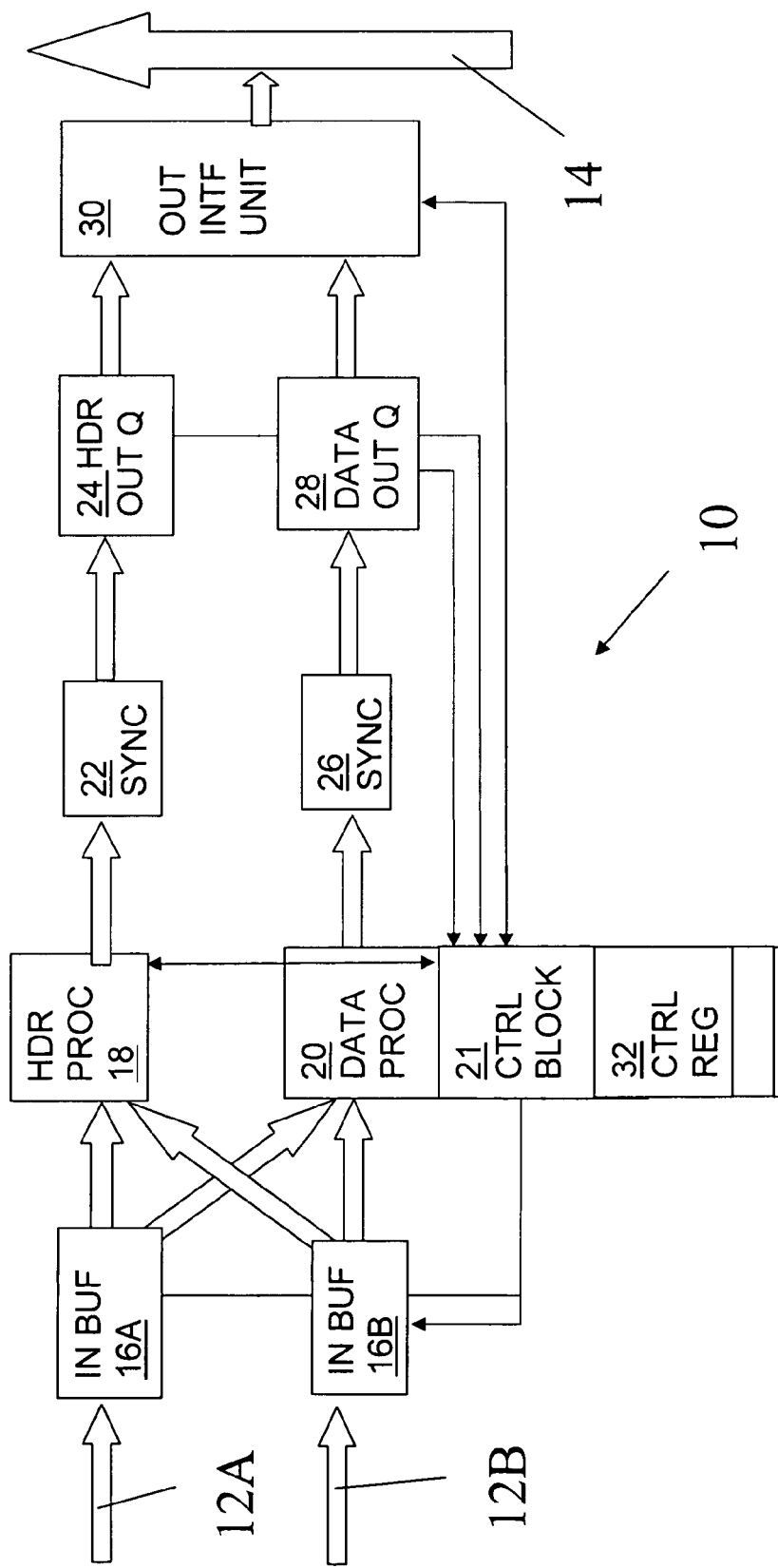
FIG. 1 is a block diagram of one form of data forwarder according to an embodiment of the invention.

Referring to the drawings, and initially to FIG. 1, one form of data forwarder constructed in accordance with the invention, indicated generally by the reference numeral 10, serves to forward data from two incoming channels 12A, 12B to an output 14. Each incoming data channel 12A, 12B delivers data to an input queue 16A, 16B. The data arriving through the input channels 12A, 12B is in the form of transactions. Each transaction starts with a header packet. The header packet is usually followed by at least one data packet, although a transaction can consist solely of the header packet.

The transaction packets are forwarded from the input queues 16A, 16B to a header processor 18 and a data processor 20, under the direction of a control block 21 of the data processor 20. Usually, the packets are forwarded in the order in which they are received, so that the packets of a transaction forwarded from the input channel 12A may be interleaved with the packets of a transaction forwarded from the input channel 12B.

The header processor 18 receives the header packets, and stores them in a FIFO (First In, First Out) header queue. The header processor appends sideband data to the header packets. The sideband data indicates which of the channels 12A and 12B each header packet was received from. In the present embodiment, every header packet is provided with sideband data indicating which of the channels 12A and 12B the header packet in question was received from. The header processor 18 ignores any data packets that follow a header packet.

The data processor 20 receives the header packets, notes which of the channels 12A and 12B each header packet was received from, and extracts from the header packet the number of data packets following it in the transaction. The data processor 20 then discards the header packet. The data processor 20 receives the data packets that follow a header packet, and stores them in a FIFO data queue. The data processor 20 appends sideband data to the data packets, using the information that was extracted from the header packet. The sideband data indicates which of the channels 12A and 12B the header packet was received from, and its position within its transaction. In the present embodiment, every packet has appended sideband data describing the packet in question. It will be seen that the data processor 20 may ignore any transaction consisting solely of a header packet with no data packets following it.

When a header packet reaches the head of the header queue, the header processor 18 reads the header packet, and conducts various integrity checks. If the header packet is seriously defective, the header processor may delete it, and instruct the data processor to delete the corresponding data packets. If the header packet is valid, the header processor forwards it to a synchronizer 22. The header processor 18 may re-write the header packet as necessary to comply with the packet protocol of the output 14 before forwarding it.

The synchronizer 22 allows for packets to be safely transferred from the clock domain of the data forwarder 10 to the clock domain of the output 14, if the header processor 18 is operating at a different clock frequency from the output, and specifically a header output queue 24. In this example, the header output queue 24 has a significantly lower clock frequency than the header processor 18, although that is not always the case. The synchronizer 22 may be omitted if the header processor 18 and the header output queue 24 are operating in the same clock frequency domain. The synchronizer 22 then forwards the header packet to the header output queue 24.

If the data packet at the head of the data queue within the data processor 20 is the first packet of a transaction, the data processor awaits validation of the associated header packet. When the header processor 18 informs the data processor 20 that the header packet is valid, the data processor 20 assigns a write pointer to the data packet and forwards the data packet to a synchronizer 26, similar to the synchronizer 22, which forwards the data packet to a data output queue 28. The synchronizer 26 may be omitted if the data processor 20 and the data output queue 28 are operating in the same clock frequency domain. The data processor 20 may re-write the data packet as necessary to comply with the packet protocol of the output 14 before forwarding it.

In the present embodiment, the write pointer for each data packet is selected such that all of the data packets of a single transaction are assigned to a block of contiguous space within the data output queue 28. In the present embodiment, each transaction is assigned the next available block of four addresses in the data output queue 28. The first data packet of a transaction is then usually placed at the first address within its assigned block. The blocks may be of fixed width equal to the size of the largest transaction to be processed, or may be assigned according to the size of individual transactions. In this embodiment, the data output queue has sixteen addresses, forming four blocks of four, in cyclic order. Other arrangements are of course possible. The optimum size of the output queue depends in part on the bandwidth difference between the input channels 12 and the output channel 14.

If the data packet at the head of the data queue within the data processor 20 is not the first packet of a transaction, the data processor 20 assigns a write pointer that places the packet at an appropriate address, usually the next available address, within the block assigned to its transaction in the data output queue 28. When data packets from two different transactions, one from the input channel 12A and one from the input channel 12B, are interleaved within the data processor 20, the two transactions are separated on output to the data output queue 28 using their write pointers, and the data packets of each transaction are assembled in a contiguous block.

The interleaving has little impact on the integrity of the data in the transactions, because the packets are regrouped into their transactions in the data output queue 28. The interleaving can result in significant reductions in latency of transactions being forwarded. In a non-interleaved system, if there was an embedded "bubble" of idle time between successive packets in one transaction, other traffic would be delayed while the data processor waited for the one transaction to be completed. With the interleaved approach of the present embodiment, if there is idle time between successive packets in a first transaction arriving through one input channel 12A, 12B, the packet before the "bubble" is passed through the data processor 20 to the data output queue 28. The data processor 20 is then free to process data packets of a second transaction from the other input channel 12B, 12A, and pass them through the data processor 20 to the data output queue 28. Thus, latency in the second transaction as a result of a "bubble" in the first transaction can be eliminated, or at least greatly reduced.

If, when a data packet arrives at the front of the input buffer 16A or 16B, the data queue within the data processor 20 is empty and the header packet associated with that data packet has already been validated, the data packet in question may proceed directly to the front of the data queue and be assigned a write pointer. The data processor 20 includes a bypass that enables the data packet to bypass the data queue. This saves the time that would be taken for the packet to step forward through the data queue, and reduces latency.

The data packet of each transaction that is to be placed in the first address of the block is also assigned an output start signal. The start signal may indicate to an output interface block 30 that new data is available in the data output queue 28 ready to be output onto the output 14. If the blocks in the data output queue 28 are not of constant width, the output start signal may mark the beginning of a block.

The data output queue 28 has a read pointer that revolves through the blocks of addresses. When no transaction is being output, the read pointer rests at the first address of the next block. When a transaction is ready to be output onto the output 14, the output interface block 30 first reads the header packet from the header output buffer 24, and then reads any associated data packets from the data output buffer 28. The output interface block 30 attends to any necessary output channel protocol, and outputs the packets onto the output 14. As the data packets are output, the data read pointer advances, until the data read pointer rests at the first address of the next block, ready to output the next transaction.

If the header packet of a transaction designates a data packet other than the first data packet within the transaction as a "critical" packet or as containing a "critical word," this information is extracted by the header processor 18, and is forwarded to the output interface block 30. A "critical" packet or word may be any packet or word the content of which is considered sufficiently urgent or important that there is an operational advantage in processing it ahead of its initial position. The output interface block 30 can then exceptionally read and output the "critical" packet before other packets that preceded the "critical" packet within the transaction.

In the present embodiment, the output interface block 30 may output a header packet onto the output 14 as soon as the header packet reaches the front of the header output queue 24, even if the data packets belonging to the same transaction are not yet ready. The header packet may then be followed by another header packet, or by the data packets from an earlier transaction. However, where a transaction comprises two or more data packets, all of the data packets in the transaction are transmitted together, with no other packets interleaved. Also, the header packet is always output before the data packets belonging to the same transaction. These restrictions are determined in part by the capabilities and limitations of the device that receives the transactions off the output 14, and may be different in other embodiments.

A transaction cannot be completely output onto the output 14 before the point in time (relative to the progress of each transaction through the data forwarder 10) when the last data packet reaches the data output queue 28. However, outputting can start at any time after the point in time when the header packet reaches the header output queue 24. Outputting can start at any time between these two points in time. The earlier outputting starts, the sooner the first data packet reaches its destination. The later outputting starts, the faster and more compactly the transaction is then output.

The time (relative to the progress of each transaction through the data forwarder 10) at which the output interface block 30 starts to output each transaction onto the output 14 may be determined by mode-setting control registers 32 in the control block 21. In the present embodiment, the control registers are set by software, or by the operator of the system. In the present embodiment, the control registers are typically set as part of a configuration process, depending on the expected nature and levels of traffic, and then remain at the chosen setting unless the data forwarder is reconfigured.

In one mode of operation, to minimize the latency of transmission of a transaction, the setting of the control registers 32 directs the output interface unit 30 to send out the first data packet as soon as the first data packet reaches the data output queue 28. However, if the remaining data packets of the transaction are very slow to follow the first data packet, this mode may tie up the output 14 for a long time, waiting for the data packets. This mode also imposes a burden on whatever device receives the transaction off the output 14, because the receiving device must be able to handle a transaction that arrives with substantial, and possibly irregular, gaps between data packets. However, this mode is especially useful in reducing latency if the first data packet of a transaction contains the most critical data, or otherwise contains data that the receiving device can process while waiting for the later packets.

In another mode of operation, to minimize use of bandwidth on the output 14, the setting of the control registers 32 directs the output interface unit 30 to hold the transaction in the output queue 28 until the entire transaction is present, and the transaction may then be sent in a single uninterrupted burst. The uninterrupted burst may be easier for a receiving device to handle. However, this mode may result in significantly greater latency than the previous mode, both for the transaction that is being assembled and for any transactions that follow it in the data queue.

In another mode of operation, as a compromise, the setting of the control registers 32 directs the output interface unit 30 to start to output a transaction when some of the data packets of that transaction are in the output queue 28, and when there is a reasonable expectation that the remaining packets will arrive soon, preferably just in time to be sent out on output 14. This expectation may be based on the knowledge that the final packets are already in the data queue within the data processor 20, or on an estimate of how soon the missing packets are likely to appear at the input buffer 16A or 16B. Where the arrival of packets is prompt and predictable, for example, where the input channels 12A, 12B are links from a nearby memory device, the output may start when one or two packets are still awaited by the data output queue 28.

If the output interface block 30 is unable to gain access to the output channel 14, the data output queue 28 may fill up. Once all blocks in the data output queue 28 are allocated to transactions, output of a new transaction to the data output queue cannot commence. If the first data packet of such a new transaction reaches the head of the data queue in the data processing unit 20, the data processing unit then stalls until a transaction can be output onto the output channel 14, freeing up a block of space in the data output queue 28. In that case, it is undesirable for the last data packet of a transaction that can be stored in the data output queue to be trapped in the data processing unit 20 behind the first packet of such a new transaction.

The control block 21 therefore monitors the number of available blocks of addresses in the data output queue 28. Once the first data packet for a transaction has been output to the data output queue 28, subsequent data packets for that transaction must be and are continually accepted by the data processor 20 and sent on to the data output queue 28. However, once the number of available blocks in the data output queue 28 is no greater than the number of transactions already proceeding through the data processor 20, the control block 21 inhibits the input queues 16A, 16B from releasing a new transaction to the header and data processors 18 and 20. As a result, there may be a period in which the data processor is accepting data only from one of the input queues 16A, 16B to complete the last transaction that can be accommodated in the output buffer 28, and the other input queue 16A or 16B is stalled. As long as there is continually only one available block in the data output queue 28, the data processor 20 will throttle the input channels 12A, 12B, and will accept only one transaction at a time, until there are again two available blocks in the data output queue 28. The data forwarder 10 will then again allow interleaving of transactions in the data processor 20.

Referring now to FIG. 2, in one example, two transactions, each consisting of a header packet H0, H1 and four data packets A0, B0, C0, D0 and A1, B1, C1, D1, arrive almost simultaneously through input channels 12A and 12B, as shown in FIG. 2A. The data packets are interleaved in the data queue within the data processor 20 in the order in which they arrived, A0, A1, B0, B1, C0, C1, D0, D1. Each data packet is accompanied by sideband data indicating which channel the data packet arrived through (0 or 1) and the data packet's position within its transaction (A, B, C, or D).

At the output from the data processor 20, each data packet is assigned a write pointer indicating a position within the data output buffer 28. In this example, transaction 0 is assigned to a block of addresses 0-3, and transaction 1 is assigned to addresses 4-7. The data packets are assigned to addresses within the block in the order in which they arrived through the input channels 12A and 12B. The first packet in each block is also assigned an output start signal value 1.

In the interests of clarity, a simple example has been shown in FIG. 2. However, it will be understood that the present embodiment is not limited to such a simple case. For example, the packet H1 may arrive at any point during the transaction H0, A0, B0, C0, D0. The packets do not necessarily arrive alternately; the packets may arrive more rapidly on one input channel than the other, and/or the packets may arrive at irregular intervals on one or both input channels. When one transaction has arrived it may be immediately followed by another, so that a transaction on one channel may be interleaved with the end of one transaction on the other channel and the beginning of another transaction on the other channel. The transactions may be of different lengths.

Although the invention has been described and illustrated with reference to exemplary embodiments thereof, it will be understood by those skilled in the art that various changes, omissions, and additions may be made thereto, without departing from the spirit and scope of the invention as recited in the attached claims. For example, the number of input channels 12 may be greater than two.

By way of example, the incoming channels 12A, 12B may be alternative data links from a storage device, either directly or via a crossbar circuit, and the output channel 14 may be a processor bus connecting the forwarder to a processor that receives data from the storage device. By way of example, the incoming channels 12A, 12B may be alternative links from a remote processor to a local processor on the output channel 14. The two processors may then be part of a multiprocessor computer system. However, it will be appreciated that the present invention may be applied in other circumstances where it is desired to forward data from two or more input channels to a single output channel.

What is claimed is:

1. A method, comprising:
    receiving transactions through input channels, each transaction comprising one or more data packets;
    placing the data packets of the transactions in a single data queue;
    where placing the data packets in the single data queue comprises permitting a data packet of a second transaction received through a second input channel to be interleaved between two data packets of a first transaction received through a first input channel;

associating a sideband data with the data packets;

assigning a block of address space in a data output queue to each transaction; and using at least the sideband data associated with the data packets to place each data packet from the single data queue to the block assigned to the transaction to which the data packet belongs in the data output queue.

2. A method according to claim 1, where the sideband data associated with the data packets in the single data queue indicate the channel through which the data packet was received.

3. A method according to claim 2, wherein the sideband data is associated with every data packet and indicates the position of the associated data packet within a transaction, and the sideband data is used to place the associated data packet within the block assigned to the transaction to which that data packet belongs.

4. A method according to claim 1, wherein each transaction received has a header packet as the first packet of the transaction, and comprising placing the header packet in a header queue distinct from the single data queue.

5. A method according to claim 4, wherein each header packet indicates the number of data packets in the transaction, and comprising using the indicated number to generate sideband data indicating the position of each data packet within the data packet's transaction.

6. A method according to claim 4, comprising outputting each transaction by:
    outputting the transaction's header packet; and
    after outputting the transaction's header packet, outputting data packets belonging to that transaction from the data output queue as a block.

7. A method according to claim 4, comprising placing the header packets from the header queue in order in a header output queue.

8. A method according to claim 7, wherein some transactions received are comprised of a dataless header packet without any data packets, and comprising:
    placing each dataless header packet in the header queue;
    placing each dataless header packet in the header output queue; and
    outputting each dataless header packet as a transaction.

9. A method according to claim 4, comprising validating header packets.

10. A method according to claim 9, comprising deleting invalid header packets.

11. A method according to claim 10, comprising deleting data packets belonging to the same transaction as a deleted header packet.

12. A device for forwarding data, comprising:
    a data processor arranged to receive transactions comprising data packets through input channels and to place the data packets in a single data queue, the data processor permitting a data packet belonging to one transaction received through one input channel to be interleaved between two data packets belonging to a single other transaction received through a second input channel, and the data processor associating a sideband data with the data packets where the sideband data indicates an input channel through which the data packet was received; and
    a data output queue arranged to receive the data packets from the single data queue and to store the data packets at addresses specified by the data processor;
    wherein the data processor is arranged to transmit the data packets to the data output queue in the order in which the packets are placed in the single data queue, and to specify, for the data packets of each transaction using at least the sideband data associated with the data packets, addresses in a block of contiguous addresses assigned to the transaction.

13. A device according to claim 12, further comprising an output interface unit arranged to forward data packets from the data output queue in the order of the addresses of the data packets in the data output queue.

14. A device according to claim 12, further comprising an output interface unit arranged to forward data packets from the data output queue, wherein the output interface unit is arranged to forward data packets comprised in a single transaction without interleaving, between the data packets comprised in a single transaction, packets not comprised in the same transaction, and wherein the output interface unit is arranged to forward the first data packet of a transaction at a time that is adjustable relative to the times at which the device receives the data packets of the transaction.

15. A device according to claim 14, further comprising a register that is settable to specify the time, relative to the times at which the device receives the data packets of a transaction, at which the output interface unit is to forward the first data packet of the transaction.

16. A device according to claim 12, further comprising a plurality of data input queues, one for each input channel, arranged to receive transactions from the input channels and forward the transactions to the data processor.

17. A device according to claim 12 for forwarding transactions that comprise a header packet, further comprising:
    a header processor arranged to receive the header packets of the transactions; and
    a header output queue arranged to receive the header packets from the header processor.

18. A device according to claim 17, further comprising an output interface unit arranged to forward transactions, each transaction comprising a header packet from the header output queue and associated data packets from the block of addresses assigned to the transaction in the data output queue.

19. A device according to claim 17, wherein the header processor is arranged to validate the header packets.

20. A device according to claim 19, wherein the header processor is arranged to delete invalid header packets.

21. A device according to claim 20, wherein the header processor is arranged to cause the data processor to delete data packets belonging to the same transaction as a deleted header packet.

22. A device according to claim 12, wherein the data processor is arranged to receive the transactions through two input channels.

23. A data forwarder comprising:
    first means for receiving transactions through input channels, each transaction comprising one or more data packets;
    second means for placing data packets from the first means in a single data queue, the second means permitting a data packet of one transaction from one of the input channels to be interleaved between two data packets of a single other transaction from a different one of the input channels;
    third means for associating a sideband data with the data packets;
    fourth means for assigning to each transaction from the first means a block of addresses;
    fifth means for using at least the sideband data associated with the data packets to assign to each data packet in the single data queue an address within the block of addresses assigned by the fourth means to the transaction to which the data packet belongs; and sixth means for queuing the data packets from the second means for output in accordance with the addresses assigned to the data packets by the fourth and fifth means.

24. A data forwarder according to claim 23, further comprising:

sixth means for placing header packets forming part of the transactions in a header output queue in the same order of transactions as the blocks of addresses assigned to the data packets; and seventh means for outputting transactions, each transaction comprising its header packet and associated data packets, in the order of the assigned addresses.

* * * * *